Aug. 30, 1932. E. G. DE CORIOLIS ET AL 1,873,999
PROCESS OF PRODUCING SOOTY ATMOSPHERE IN GAS FIRED FURNACES
Filed May 20, 1931
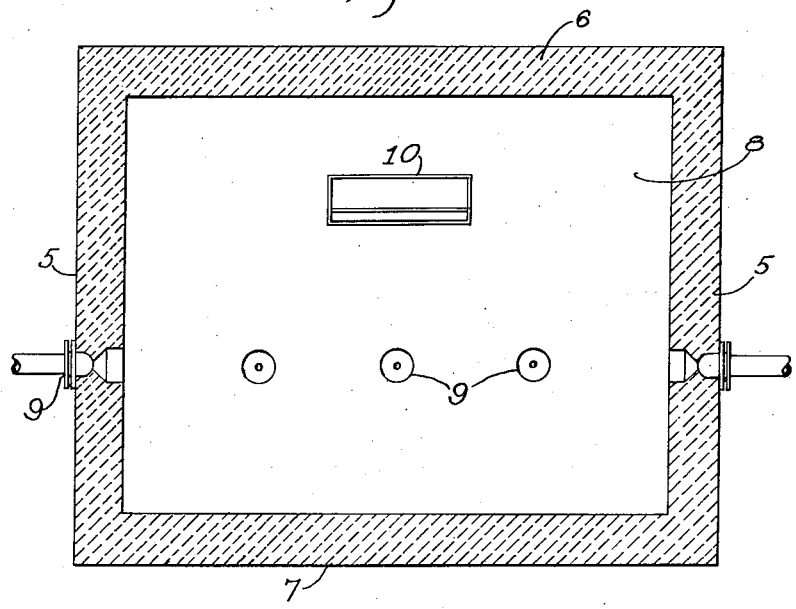
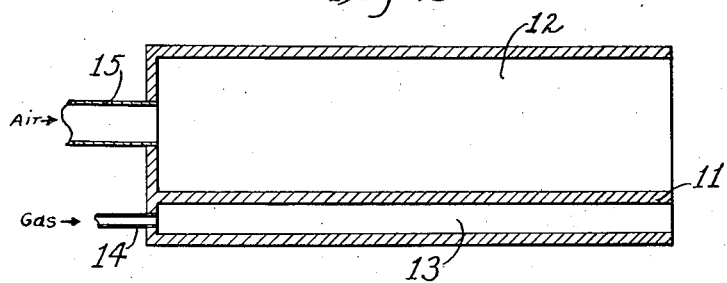
INVENTORS:
E. G. DE CORIOLIS
H. B. BARBER
BY Charles A. Lind
ATTORNEY Patented Aug. 30, 1932

1,873,999

UNITED STATES PATENT OFFICE

ERNEST G. DE CORIOLIS AND HUGH B. BARBER, OF TOLEDO, OHIO, ASSIGNORS TO SURFACE COMBUSTION CORPORATION, OF TOLEDO, OHIO, A CORPORATION OF NEW YORK

PROCESS OF PRODUCING SOOTY ATMOSPHERE IN GAS-FIRED FURNACES

Application filed May 20, 1931. Serial No. 538,714.

This invention relates to the art of heating easily oxidizable material, such as iron and steel, and more particularly to the art of heating such material in gas fired furnaces.

When material such as sheet steel is heated in a coal fired furnace, it is the practice to maintain a somewhat underventilated fire with a view to producing a smoky atmosphere within the furnace chamber. This smoky atmosphere deposits particles of carbon on the steel, the carbon having a beneficial action as it tends to reduce surface oxidation of the steel.

In a gas fired furnace, it is the practice to burn a preformed, usually explosive, mixture of fuel gas and air in order to produce highly heated products of combustion for circulation through the furnace. Such a mixture burns very rapidly and produces in the furnace a clear atmosphere of products of combustion composed chiefly of nitrogen, carbon dioxide, carbon monoxide and water vapor. Such an atmosphere constitutes the so called "neutral" or "reducing" furnace atmosphere,—neutral if it contains no free oxygen or carbon monoxide and reducing if it contains a percentage of carbon monoxide with no free oxygen. However, even when maintaining a reducing furnace atmosphere in a gas fired furnace where the atmosphere is clear, it is not possible to secure the same character of surface as is obtained when heating steel in the smoky atmosphere of a coal fired furnace.

Depending on the temperature of the furnace whereinto raw fuel gas, that is, gas without admixture with air, is introduced, the gas will or will not decompose with liberation of free carbon. At relatively high temperatures, such as the forging temperature of steel, the gas will decompose with the liberation of free carbon, but at relatively low temperatures it will not so decompose.

The present invention has for its object to provide a simple and practical method of introducing free carbon into a normally clear furnace atmosphere in order to obtain conditions which shall be conducive to the protection of the material from the deleterious effects of gaseous products of combustion and which shall be conducive to better heat distribution within the furnace.

In accordance with the present invention, free carbon is introduced into a normally clear furnace atmosphere by injecting into the furnace, as one substantially non-turbulent stream, individual parallel and contacting layers of air and fuel gas in order that combustion of said gas shall proceed at a relatively slow rate and then only where the air and gas interdiffuse. The progressive heat of combustion thus resulting will progressively heat the non-burning gas to a sufficiently high temperature to crack the same with the result that free carbon will be liberated from the gas and float about in a more or less incandescent state in the highly heated furnace atmosphere until it eventually deposits on the work being heated where it effectively prevents oxidation of the work.

Depending on the rate of combustion desired, the gas may be admixed with some air before being injected into the furnace in which event the amount of air supplied in the parallel stream may be reduced. However, the slower the rate of combustion, the greater is the amount of carbon obtained from any given quantity of gas and hence it is preferred to admix but little if any air with the gas prior to its introduction into the furnace.

Referring to the accompanying drawing wherein the manner of applying the invention is illustrated,—

Fig. 1 is a vertical section through a furnace showing burners for burning premixed air and gas for heating the furnace and also showing means for injecting air and gas in contacting layers as previously described, and Fig. 2 is a vertical longitudinal section through the means shown in Fig. 1 for injecting air and gas in parallel contacting streams into the furnace.

In the drawing, 5 indicates the side walls of any desired or preferred type of furnace; 6 the roof, 7 the floor or hearth, and 8 an end wall thereof. The furnace is fired by any suitable type of burners 9 adapted to burn premixed air and fuel gas, the burners being so positioned as to be conducive to efficient heating. 10 indicates means for injecting parallel and contacting streams of air and fuel gas into the furnace, said means being hereinafter called "carbon diffuser".

As shown in Fig. 2, the carbon diffuser preferably comprises a box-like casing open at one end and provided with a longitudinally extending partition 11 whereby to form two parallel passages 12 and 13. Gas is delivered into the passage 13 by a supply pipe 14 and air is delivered into the passage 12 by a supply pipe 15. The air passage will ordinarily be of greater depth than the gas passage because of the proportionately greater volume of air required.

The gas and air are caused to flow from their respective passages at substantially the same velocity which velocity is sufficiently low to reduce turbulence in the respective streams to a minimum and to give stream line flow, it being understood that mixing of the gas and air due to turbulence is not desired, it being essential that such mixing as does occur shall be due primarily to interdiffusion between the air and gas. Combustion occurs only where and when the gas and air interdiffuse in proportions for combustion and such combustion proceeds at a relatively slow rate. The heat of such combustion will crack the non-burning gas and thus cause it to decompose with the liberation of free carbon. As previously stated, some air may be admixed with the gas previously to its being delivered to the supply pipe 15.

The free carbon thus liberated floats about in the highly heated furnace atmosphere in a more or less incandescent state and in due course a greater or less amount thereof will deposit on the work and protect it from the oxidizing effect of the gaseous products of combustion.

The invention has special utility in connection with the annealing or normalizing of metal sheets either singly or in groups since the finely divided carbon which deposits on the sheets not only serves to protect the sheets from surface oxidation but also facilitates subsequent rolling operations. Moreover, when the sheets are being heat-treated in packs the carbon penetrates between the sheets thus preventing them from sticking. It will, however, be readily appreciated that the invention is not limited in its application to annealing or normalizing furnaces, and, therefore, no limitations as to use are intended except as may be expressed in the claims.

What is claimed is:

1. A method of counteracting the scaling effect of a clear atmosphere of hot gaseous products of combustion on steel while the latter is being heated in such atmosphere, comprising simultaneously introducing into said atmosphere a stream of hydrocarbon fuel gas and a contiguous stream of air and causing said streams to flow at a sufficiently low velocity to form a single substantially non-turbulent stream, whereby the heat of combustion causes the formation of free carbon from the fuel due to incomplete combustion thereof.

2. A method of counteracting the scaling effect of a clear atmosphere of hot gaseous products of combustion on steel while the latter is being heated in such atmosphere, comprising simultaneously introducing into said atmosphere a stream of hydrocarbon fuel and a contiguous stream of air and causing said streams to flow at a sufficiently low velocity to form a single substantially non-turbulent stream, whereby the heat of combustion causes the formation of free carbon from the fuel due to incomplete combustion thereof.

3. A method of conditioning the atmosphere within a furnace which is normally heated in a manner to produce a substantially clear furnace atmosphere, comprising the introduction into the furnace of a stream of hydrocarbon fuel gas and a stream of air, said streams being contiguous and of sufficiently low velocity to form a single substantially non-turbulent stream, whereby the heat of combustion causes the formation of amorphous carbon from the undiffused portion of said fuel gas.

4. A method of conditioning the atmosphere within a furnace which is normally heated in a manner to produce a substantially clear furnace atmosphere, comprising the introduction into the furnace of a stream of hydrocarbon fuel and a stream of air, said streams being contiguous and of sufficiently low velocity to result in a substantially non-turbulent stream line flow, so that combustion of the fuel gas stream occurs progressively at a comparatively slow rate and only adjacent contiguous portions of the fuel and gas streams where interdiffusion takes place, the heat of combustion causing other portions of the fuel gas stream to crack with a liberation of free carbon.

ERNEST G. DE CORIOLIS.
HUGH B. BARBER.